US008780085B2

(12) United States Patent
Travis et al.

(10) Patent No.: US 8,780,085 B2
(45) Date of Patent: Jul. 15, 2014

(54) RESOLUTION ENHANCEMENT

(75) Inventors: Adrian Travis, Seattle, WA (US); Timothy Large, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 64 days.

(21) Appl. No.: 12/849,685

(22) Filed: Aug. 3, 2010

(65) Prior Publication Data
US 2012/0032919 A1 Feb. 9, 2012

(51) Int. Cl.
G06F 3/042 (2006.01)
H04N 1/04 (2006.01)
F21V 7/04 (2006.01)
G02F 1/1335 (2006.01)

(52) U.S. Cl.
USPC .............. 345/175; 349/63; 362/603; 358/484

(58) Field of Classification Search
USPC ................... 345/175–176, 173; 348/224.1
See application file for complete search history.

(56) References Cited

U.S. PATENT DOCUMENTS

| 6,031,569 | A  | * | 2/2000  | Nobuoka et al. | ........... 348/220.1 |
| 6,661,542 | B1 | * | 12/2003 | Mangerson | ................... 358/484 |
| 6,738,051 | B2 | * | 5/2004  | Boyd et al. | ...................... 345/176 |
| 7,003,177 | B1 |   | 2/2006  | Mendlovic et al. | |
| 7,628,493 | B2 |   | 12/2009 | Gulvin et al. | |
| 2006/0165307 | A1 |   | 7/2006 | Kondo et al. | |
| 2007/0040828 | A1 |   | 2/2007 | Zalevsky et al. | |
| 2008/0018732 | A1 |   | 1/2008 | Moller | |
| 2008/0117231 | A1 |   | 5/2008 | Kimpe | |
| 2008/0170173 | A1 | * | 7/2008 | Park et al. | ........................ 349/62 |
| 2008/0231611 | A1 | * | 9/2008 | Bathiche et al. | .............. 345/175 |
| 2008/0266468 | A1 |   | 10/2008 | Cossairt et al. | |
| 2009/0040426 | A1 |   | 2/2009 | Mather et al. | |
| 2010/0187422 | A1 | * | 7/2010 | Kothari et al. | ................ 250/353 |

FOREIGN PATENT DOCUMENTS

| CN | 1511301 A | 7/2004 |
| CN | 1802847 A | 7/2006 |
| KR | 1020080046425 A | 5/2008 |
| WO | 2010085286 A1 | 7/2010 |

OTHER PUBLICATIONS

"International Search Report", Mailed Date: Feb. 21, 2012, Application No. PCT/US2011/044422, Filed Date: Jul. 19, 2011, pp. 7.
Son, et al., "Methods for Displaying Three-Dimensional Images", Retrieved at << http://ieeexplore.ieee.org/stamp/stamp.jsp?arnumber=01605199 >>, Proceedings of the IEEE, vol. 94, No. 3, Mar. 2006, pp. 502-523.

(Continued)

*Primary Examiner* — Kent Chang
*Assistant Examiner* — Nathan Brittingham
(74) *Attorney, Agent, or Firm* — Jeremy Snodgrass; Glen Johnson; Micky Minhas

(57) ABSTRACT

A method of enhancing input imaging resolution includes sequentially blocking light from different portions of an object with a series of resolution-enhancing patterns displayed between the object and an image detector. The method further includes detecting light filtered by the series of resolution-enhancing patterns and integrating light detected while different resolution-enhancing patterns of the series of resolution-enhancing patterns are displayed between the object and the detector.

17 Claims, 4 Drawing Sheets

(56) References Cited

OTHER PUBLICATIONS

De Vaan, Adrianus J.S.M., "Competing Display Technologies for the Best Image Performance", Retrieved at << http://www.vaan.nu/publications/VaanCIC14Proceedingsv2.0.pdf >>, Journal of the Society for Information Display, vol. 15, No. 9, Sep. 2007, pp. 6.

Lee, et al., "Flat-Panel Autostereoscopic 3D Display", Retrieved at << http://ieeexplore.ieee.org/stamp/stamp.jsp?arnumber=04455550 >>, Optoelectronics, IET, vol. 02, No. 1, Feb. 2008, pp. 24-28.

Jones, et al., "Stereoscopic Flat Panel Display", Retrieved at << http://www.dtic.mil/cgi-bin/GetTRDoc?AD=ADA433529&Location=U2&doc=GetTRDoc.pdf >>, 2004, pp. 1-8.

State Intellectual Property Office of China, Office Action of Chinese Patent Application No. 201110220733.2, Aug. 21, 2013, 11 pages.

State Intellectual Property Office of China, Office Action for Chinese Patent Application No. 201110220733.2, Apr. 18, 2014, 15 pages.

\* cited by examiner

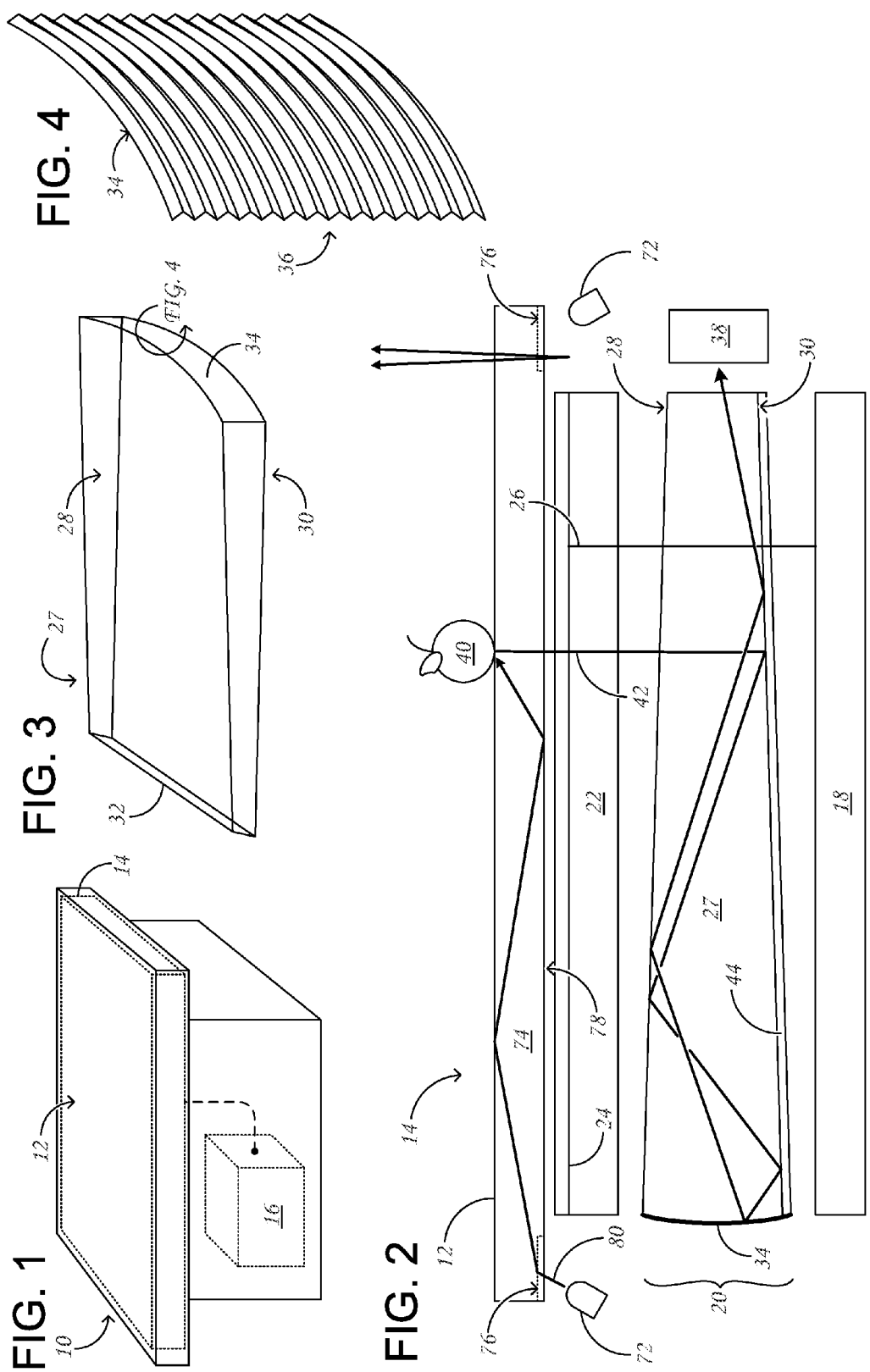

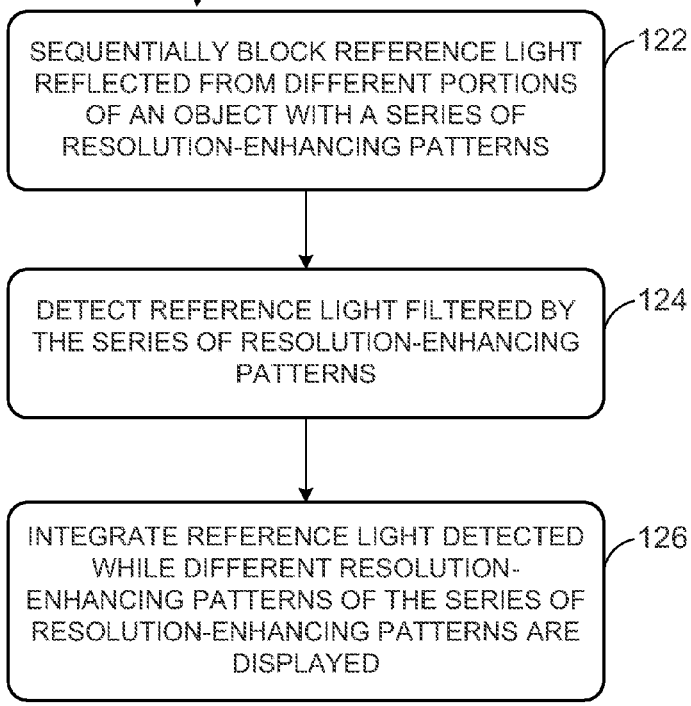
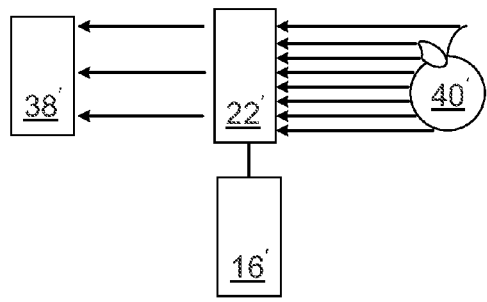
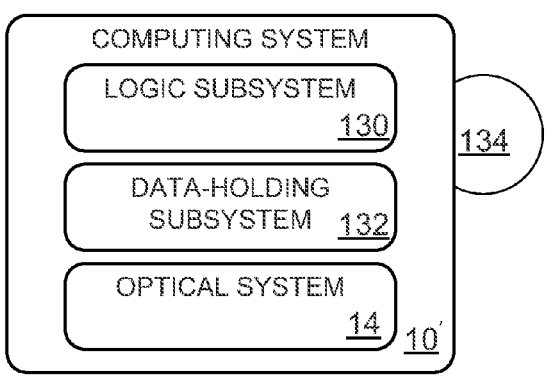

RESOLUTION ENHANCEMENT

BACKGROUND

A computer system may include one or more optical systems that provide an image as output or receive an image as input. Example optical systems include displays, cameras, scanners, and certain kinds of touch-sensitive input systems. In many applications it is beneficial to input and/or output high resolution images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of enhancing input imaging resolution is provided. The method includes sequentially blocking light from different portions of an object with a series of resolution-enhancing patterns displayed between the object and an image detector. The method further includes detecting light filtered by the series of resolution-enhancing patterns with the image detector and integrating light detected while different resolution-enhancing patterns of the series of resolution-enhancing patterns are displayed between the object and the image detector.

BRIEF DESCRIPTION OF THE DRAWINGS

FIG. 1 shows aspects of an example computer system in accordance with the present disclosure.

FIG. 2 is a schematic, cross-sectional view showing aspects of an optical system in accordance with the present disclosure.

FIGS. 3 and 4 show aspects of an example wedge-shaped light guide in in accordance with the present disclosure.

FIG. 7 shows an example method of enhancing input imaging resolution in a touch-sensitive display including a wedge-shaped light guide including an array of facets.

FIG. 8 schematically shows an image detection system in which light from a detected object passes through a light valve capable of sequentially displaying a series of resolution-enhancing patterns.

FIG. 9 shows an example computing system in accordance with the present disclosure.

DETAILED DESCRIPTION

Figure 5:
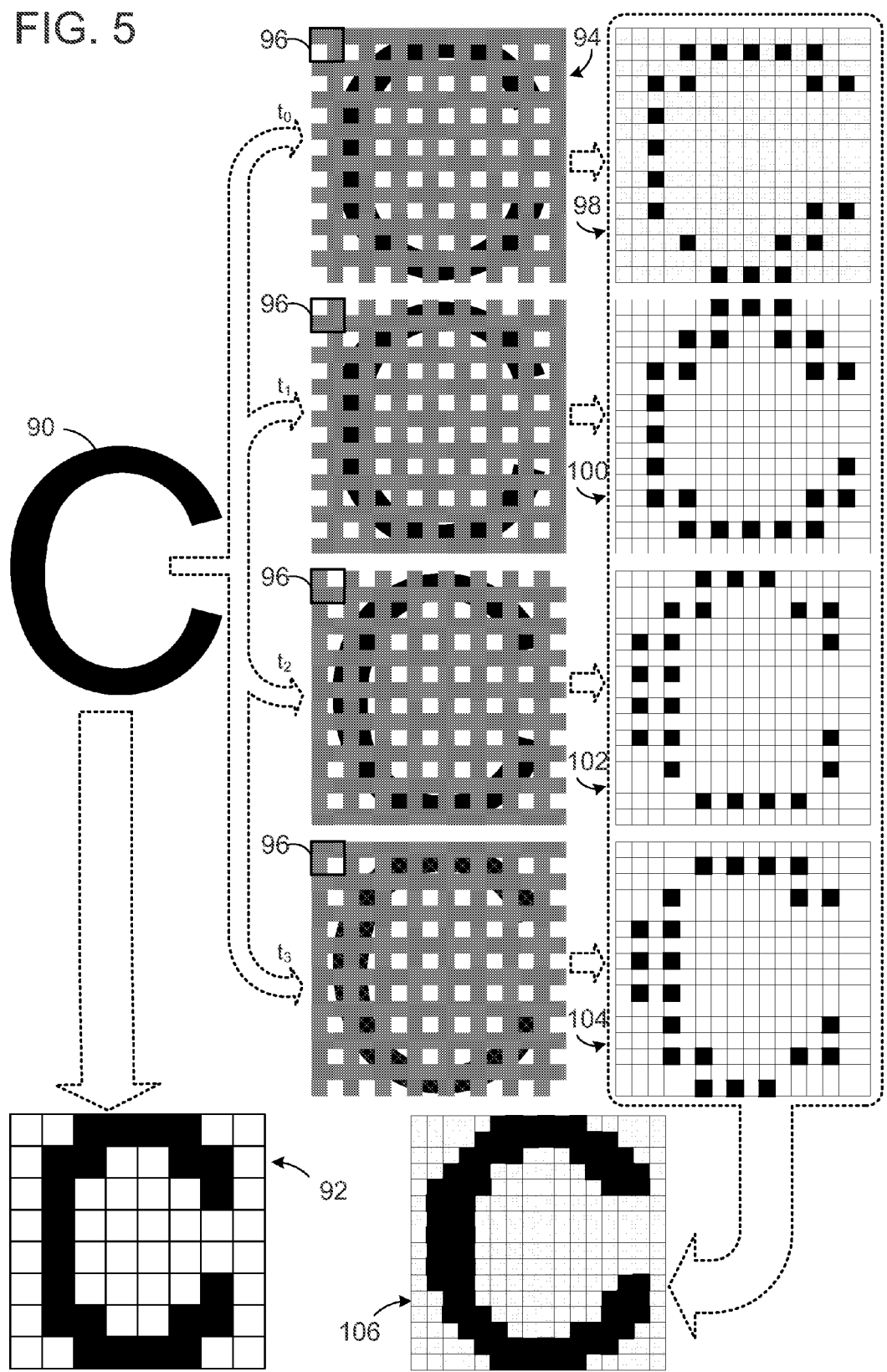
FIG. 5 shows an example of sequentially displaying a series of resolution-enhancing patterns at an object area on the display surface where the object is located, in accordance with the present disclosure.

The resolution enhancement of images is described below. Such resolution enhancement is thought to allow cameras and other image detectors to accurately detect high resolution aspects of imaged objects. Using the teachings of the present disclosure, an image detection system may use selective light filtering and integration of input images from two or more sequential frames to enhance the resolution at which objects can be imaged.

The subject matter of the present disclosure is described by way of example and with reference to certain non-limiting embodiments. In particular, much of the following description is directed to an example image detection system in the form of a touch sensitive display that may benefit from the disclosed resolution enhancement techniques. However, it is to be understood that the resolution enhancement techniques disclosed herein may be applied to any image detection system in which light from a detected object passes through a light valve capable of sequentially displaying a series of resolution-enhancing patterns. While a touch sensitive display is provided as one non-limiting example, the same principles may be applied to cameras or other image detection systems.

In the following description, components that may be substantially similar in two or more embodiments are identified coordinately and are described with minimal repetition. It will be noted, however, that components identified coordinately in different embodiments of the present disclosure may be at least partly different. It will be further noted that the drawings included in this disclosure are schematic. Views of the illustrated embodiments are generally not drawn to scale, and aspects of some drawings may be purposely distorted to make selected features or relationships easier to see.

FIG. 1 shows aspects of an example computing system 10 in one embodiment. The computer system includes a large-format, touch-sensitive display surface 12. Optical system 14, located below the touch-sensitive display surface, may be configured to provide both display and input functionality for the computer system. Accordingly, FIG. 1 shows controller 16 operatively coupled to the optical system. The controller may be any device configured to provide display data to and receive input data from the optical system. In some embodiments, the controller may comprise all or part of a computer; in other embodiments, the controller may be any device operatively coupled to a computer via a wired or wireless communications link.

To provide display functionality, optical system 14 may be configured to project a visible image onto the touch-sensitive display surface. To provide input functionality, the optical system may be configured to capture at least a partial image of objects positioned on or near the touch-sensitive display surface—fingers, electronic devices, paper cards, or game pieces, for example. Accordingly, the optical system may be configured to illuminate such objects and to detect the light reflected from the objects. In this manner, the optical system may register the position, footprint, patterns, markings, and other properties of any suitable object placed on the touch-sensitive display surface.

FIG. 2 is a schematic, cross-sectional view showing aspects of optical system 14 in one embodiment. The optical system includes backlight 18, imaging optic 20, light valve 22, and diffuser 24. The backlight and light valve may be operatively coupled to controller 16 and configured to provide a visual display image to touch-sensitive display surface 12. In particular, light valve 22 may be configured to modulate light from backlight 18 into a visual display image in accordance with instructions received from controller 16. Light valve 22 may be positioned optically intermediate the display surface 12 and the front face of a wedge-shaped light guide 27.

Backlight 18 may be any illuminant configured to emit visible light. Light from the backlight (light ray 26, for example) is projected through imaging optic 20 and is modulated with respect to color and intensity by numerous lightgating elements of light valve 22. In some embodiments, the light valve may comprise a liquid-crystal display device, but other light-modulating devices may be used as well. In this manner, the backlight and the light valve may together create a display image. The display image is projected through diffuser 24 and is thereby provided to touch-sensitive display surface 12. To ensure adequate display-image intensity, the imaging optic and the diffuser may be configured to transmit a substantial portion of the visible light incident upon them, at least in a direction normal to the touch-sensitive display surface, from which direction the display image would typically be viewed.

In the embodiment shown in FIG. 2, imaging optic 20 comprises wedge-shaped light guide 27 having a front face 28 and a back face 30. FIG. 3 illustrates one example wedge-shaped light guide in greater detail. It will be understood, however, that no aspect of FIG. 3 is intended to be limiting, because numerous wedge-shaped light guide variants are contemplated.

Referring now to FIG. 3, the opposing front and back faces of the wedge-shaped light guide may, in some embodiments, be substantially planar and nearly parallel, but offset from each other by a wedge angle (e.g., a wedge angle of 1° or less). In one specific embodiment, the wedge angle may be 0.72 degrees, for example. As used herein, a 'substantially planar' surface is one that broadly conforms to a plane when surface roughness and manufacturing anomalies are not considered. For example, in one specific embodiment, a substantially planar surface may have a roughness of 3 nanometers (roughness average) or less. The wedge-shaped light guide may be oriented symmetrically with respect to the horizontal and/or any plane parallel to touch-sensitive display surface 12. Therefore, the angle of intersection between the front or back face of the light guide and any plane parallel to the touch-sensitive display surface may be one-half the wedge angle.

Wedge-shaped light guide 27 has a thinner side 32, and a thicker side 34 opposite the thinner side. In the example illustrated in FIG. 3, the wedge-shaped light guide may be milled on the thicker side to define a section of a sphere enclosed by an acute central angle. The radius of curvature of the section so defined may be determined based on the detailed configuration of optical system 14, in which the wedge-shaped light guide is to be installed. In one particular embodiment, the thicker side is approximately twice the thickness of the thinner side, and the radius of curvature of the thicker side is approximately twice the length of the wedge-shaped light guide. In some embodiments, one or more sides of the wedge-shaped light guide (e.g., thinner side 32 or thicker side 34) may function as a lens, where the radius of curvature defines a focal length of the lens.

A more detailed sectional view of thicker side 34 in one, non-limiting embodiment is shown in FIG. 4. The drawing shows an array of substantially planar facets 36 running horizontally along the thicker side of the wedge-shaped light guide. The facets define a series of horizontal ridges that extend to meet the front and back edges of the thicker side. The facets may be coated with a reflective material to form an interleaved reflector on the thicker side. The interleaved reflector so formed may serve various functions in the optical system in which the light guide is installed—directing an image from an object on the touch-sensitive display surface onto a detector, for example. In one, non-limiting example, twenty-seven facets may be formed in the thicker side of the wedge-shaped light guide, forming a series of horizontal ridges spaced about 840 microns apart and extending about 80 microns from a front or back edge of the thicker side. In other examples, the thicker side of the wedge-shaped light guide may have any other suitable shape or profile. Based on a wedge-shaped light guide as described herein, imaging optic 20 may be configured to transmit light laterally between the opposing first and second faces at least partly via total internal reflection from a boundary of the wedge-shaped light guide. It will be understood, of course, that the details of the configuration described here and in FIG. 3 are presented for the purpose of example, and are not intended to be limiting in any manner.

Returning now to FIG. 2, optical system 14 may be further configured to provide input functionality to computing system 10. Accordingly, the illustrated optical system includes detector 38. The detector may be a camera—an infrared-sensitive, digital camera, for example. Imaging optic 20 may be configured to direct onto the detector light from one or more objects that are contacting or almost contacting touch-sensitive display surface 12. Such light may originate from various sources, as described hereinafter. Accordingly, the detector may capture at least a partial image of the one or more objects. Detector 38 may optionally include two or more detection devices, which may be configured to detect light in one or more wavelength ranges.

FIG. 2 shows object 40 in contact with touch-sensitive display surface 12, and light ray 42 propagating away from the object. The illustrated light ray is shown passing through various components of optical system 14 and into imaging optic 20. To image light from the touch-sensitive display surface onto detector 38, the imaging optic may be configured to turn the light towards the reflective thicker end of the wedge-shaped light guide and to confine the turned light en route to the detector via total internal reflection. Accordingly, back face 30 of the imaging optic comprises multilayer turning structure 44. The present disclosure embraces numerous variants of the multilayer turning structure. For example, the multilayer turning structure may be reflective, so that light is directed back through wedge-shaped light guide 27.

As noted above, light from one or more objects disposed on the touch-sensitive display surface may originate from various sources. In some embodiments, the light may be emitted by the objects. In some embodiments, the reference light that illuminates the objects may include bands of infrared light and bands of visible light.

In the embodiment illustrated in FIG. 2, at least some of the reference light is provided by diffuse illumination of the objects, and reflected back through the touch-sensitive display surface. Thus, FIG. 2 shows infrared emitters 72—infrared light-emitting diodes, for example—and illuminating light guide 74. In the configuration illustrated in FIG. 2, the illuminating light guide is configured to illuminate the one or more objects from behind the touch-sensitive display surface. The illuminating light guide may be any optic configured to admit infrared light from one or more entry zones 76 and to project at least some of the infrared light from exit zone 78. The entry and exit zones of the illuminating optic may each comprise a turning film or other turning structure. In order to admit light from the infrared emitters and simultaneously provide the desired light-turning function, the turning structures associated with the entry zone and the exit zone may be oriented differently from each other. Further, the exit zone may comprise a low-angle diffuser film.

FIG. 2 shows infrared light ray 80, for example, entering illuminating light guide 74 through entry zone 76, being turned via a turning structure of the entry zone, and undergoing an internal reflection at a boundary of the illuminating light guide. The internal reflection is a consequence of the illustrated light ray intersecting the boundary at an angle greater than the Snell's Law critical angle. Continuing forward, the illustrated light ray interacts with the turning structure of exit zone 78, and is reflected substantially upward from the exit zone. At least some of the illustrated light ray is now transmitted through the boundary of the illuminating light guide to illuminate object 40, instead of being totally internally reflected; this is because the illustrated light ray now intersects the boundary at an angle less than the critical angle.

In the embodiment illustrated in FIG. 2, exit zone 78 of illuminating light guide 74 is planar and substantially parallel to touch-sensitive display surface 12. In this configuration, light reflected from object 40 is projected from the exit zone and passes to light valve 22. It will be understood however, that numerous other illumination configurations are possible, and are equally consistent with the present disclosure.

The array of substantially planar facets 36 may introduce aperture diffraction and/or other optical effects that may reduce the resolvable resolution of the reference light passed to the detector 38. As a non-limiting example, the resolution may be effectively reduced to approximately 1 mm, which may be insufficient for the detection of some markings. For example, accurately reading a barcode may be hindered by a resolution worse than 0.5 mm. Further, any degradation of the resolution may result in the detector 38 not being used to its full capabilities.

Resolution may be enhanced by filtering reference light from the touch-sensitive display surface 12 before it reaches detector 38. In particular, the light valve 22 may be used to create an array of small windows through which reference light may pass, while reference light not traveling through such windows is blocked. The resolution of the array of small windows may be sufficiently low so as to pass reference light without degradation through the wedge-shaped light guide. The light valve 22 may be used to spatially move the position of the windows from frame to frame so that an entire high resolution image can be integrated together from two or more frames of detected reference light.

FIG. 5 schematically illustrates this concept. In particular, FIG. 5 shows an object 90 that includes the letter "C" on its underside. Such an object may be placed on display surface 12 so that the letter "C" may be imaged (i.e., read) by detector 38. When reference light travels from object 90 to detector 38, effective resolution may be degraded as light reflects at the array of substantially planar facets 36. To schematically illustrate this concept, FIG. 5 shows a low-resolution image 92 of the object 90. For simplicity of illustration, low-resolution image 92 is drawn with resolution degradation in both the horizontal and vertical dimensions, although the array of substantially planar facets may only cause resolution degradation in one dimension. Furthermore, low-resolution image 92 is drawn with 1-bit color depth where each pixel is either black or white, although detector 38 may be capable of detecting multi-bit grayscale and/or color images, and some pixels may be detected as being a shade between pure black and pure white. In other words, actual degradation may be less pixilated than illustrated in FIG. 5.

Controller 16 of FIG. 1 may be configured to cause the light valve 22 to sequentially display a series of resolution-enhancing patterns at the object area to block reference light reflected from different portions of the object 90. As shown in FIG. 5, at time $t_0$, a first resolution enhancing pattern 94 in the series of resolution-enhancing patterns may be used to block reference light travelling from object 90 to the detector 38. The resolution-enhancing pattern includes a spatially repeating block 96 of N pixel groups. For example, FIG. 5 shows block 96 having four pixel groups—namely an upper left pixel group, an upper right pixel group, a lower right pixel group, and a lower left pixel group. At time $t_0$, the lower left pixel group is open (i.e., not blocking reference light), while the other three pixel groups are closed (i.e., blocking reference light). A pixel group may include any suitable number of pixels. As an example, each pixel group may include a single pixel from a liquid crystal display, or, as another example, a pixel group may include a four-by-four matrix of adjacent pixels from a liquid crystal display.

FIG. 5 schematically shows a high-resolution sub-image 98 that is detected by detector 38 while the first resolution enhancing pattern 94 is displayed by light valve 22. For simplicity of illustration, high-resolution sub-image 98 is also drawn with 1-bit color depth where each pixel is either black or white.

As shown at times $t_1$, $t_2$, and $t_3$, a different pixel group in the block 96 opens to allow reference light to travel from the object to the detector while all other pixel groups in the block close to block reference light travelling from the object to the detector. In particular, at time $t_1$, the upper left pixel group opens; at time $t_2$, the upper right pixel group opens; and at time $t_3$, the lower right pixel group opens. This sequence may continue until all pixel groups have been opened for at least one frame, and then the sequence may repeat.

As demonstrated by high-resolution sub-image 100, high-resolution sub-image 102, and high-resolution sub-image 104, detector 38 may image different pixels when each different resolution-enhancing pattern is used to filter the reference light. Each pixel that is imaged in the high-resolution sub-images is imaged independently of immediately adjacent pixels, because the immediately adjacent pixels are filtered by the resolution-enhancing pattern. As such, the effective resolution of the high-resolution sub-images is finer than the effective resolution of an unfiltered image. However, the high-resolution sub-images do not independently represent the full image. For example, each high-resolution sub-image of FIG. 5 images only one fourth of the full image, because each spatially repeating block 96 of the resolution-enhancing pattern includes four pixel groups, and only one pixel group out of the four pixel groups is opened at a time.

The controller 16 may be configured to integrate reference light detected by the detector during sequential display of the resolution-enhancing patterns into an integrated high-resolution image 106. In particular, the controller may integrate reference light detected by the detector during N sequential frames, where N is the number of pixel groups constituting a spatially repeating block of the resolution-enhancing pattern. Using the example of FIG. 5, the controller may integrate reference light detected by the detector during four sequential frames corresponding to times $t_0$, $t_1$, $t_2$, and $t_3$.

As can be seen by way of comparison, integrated high-resolution image 106 has a finer resolution than the unfiltered low-resolution image 92. The size of the pixel groups that are used to form the windows through which the reference light is filtered may be selected to achieve a desired resolution.

Figure 6:
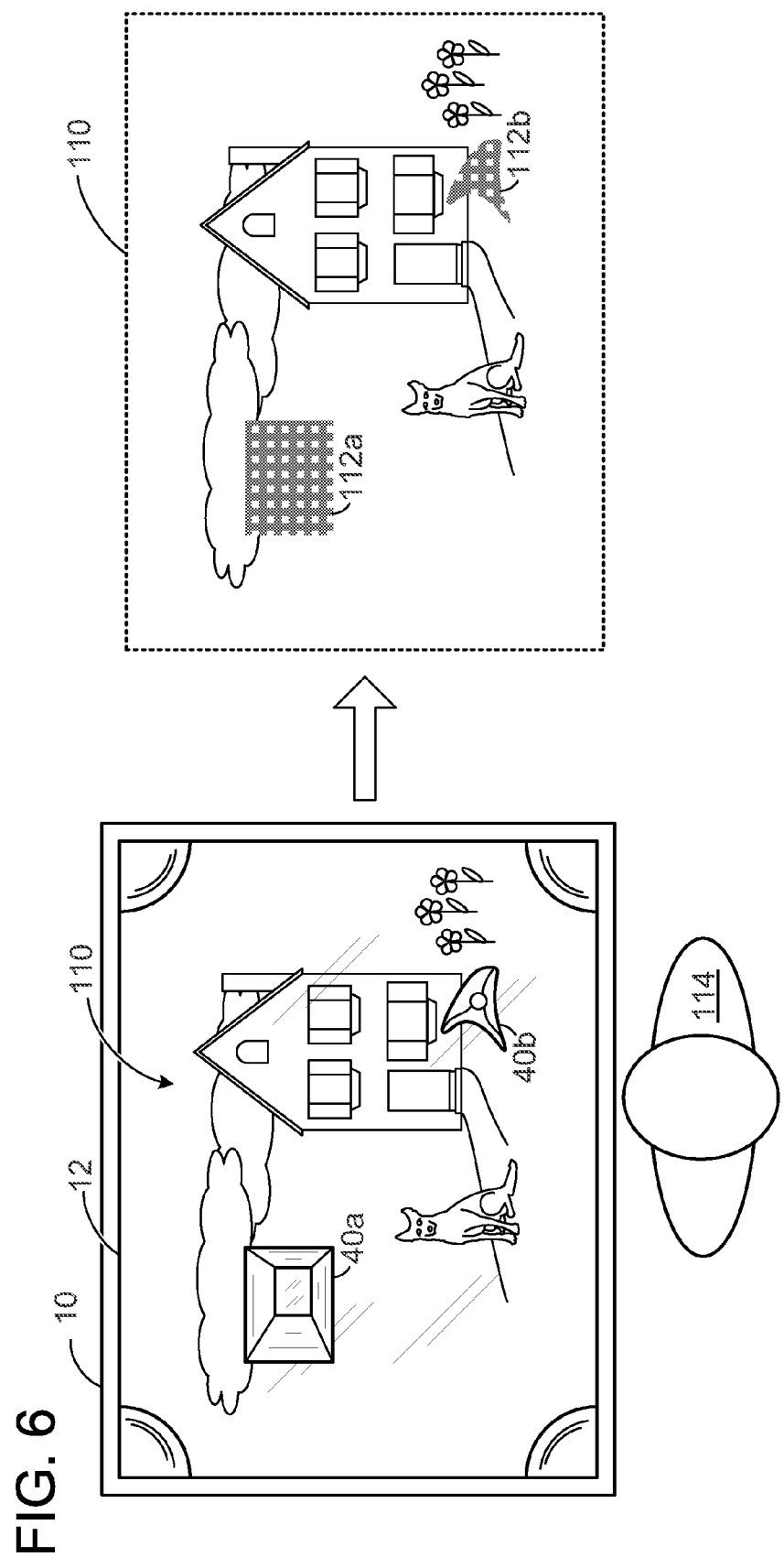
FIG. 6 schematically shows an example computing system displaying a visual display image in accordance with the present disclosure.

In some embodiments, the resolution-enhancing pattern may be displayed under objects that are detected on or near display surface 12, while other areas of the display surface are used to display other images to a user. For example, FIG. 6 shows an example computing system 10 displaying a visual display image 110. In the illustrated embodiment, a first object 40a and a second object 40b are resting on the display surface 12 of the computing system 10. FIG. 6 also shows a schematic representation of the visual display image 110 displayed by the light valve of the computing system 10 with the first object 40a and the second object 40b omitted. As can be seen, visual display image 110 includes a first resolution-enhancing pattern 112a aligned under first object 40a and a second resolution-enhancing pattern 112b aligned under second object 40b. Such resolution-enhancing patterns are not seen by a user 114 because the resolution-enhancing patterns are under first object 40a and second object 40b.

The controller of the computing system 10 may be configured to analyze an amount or pattern of reference light detected by the detector to determine an object area on the display surface where an object is located. When an object area is detected in this manner, the controller can instruct the light valve to interrupt the previously presented visual display image with a visual display image that includes resolution-enhancing patterns at the detected object area. In some embodiments, the light valve may be substantially transparent to one or more bands of light, and these bands of light may be used to determine the object area on the display surface where the object is located regardless of the visual display image that is being presented by the light valve. In some embodiments, light having a wavelength of 800 nm or longer may be used to detect objects in this way.

FIG. 7 shows an example method 120 of enhancing input imaging resolution in a touch-sensitive display including a wedge-shaped light guide including an array of facets. At 122, method 120 includes sequentially blocking reference light reflected from different portions of an object with a series of resolution-enhancing patterns displayed between the object and the wedge-shaped light guide. At 124, method 120 includes detecting reference light filtered by the series of resolution-enhancing patterns, travelling through the wedge-shaped light guide, and reflecting off the array of facets within the wedge-shaped light guide. At 126, method 120 includes integrating reference light detected while different resolution-enhancing patterns of the series of resolution-enhancing patterns are displayed between the object and the wedge-shaped light guide.

As introduced above, the resolution enhancement techniques disclosed herein may be applied to any image detection system in which light from a detected object passes through a light valve capable of sequentially displaying a series of resolution-enhancing patterns. As a non-limiting example, FIG. 8 shows an image detection system 128 including a detector 38' configured to detect light from an object 40' after the light passes through a light valve 22'. Image detection system 128 includes a controller 16' operatively coupled to light valve 22' and configured to cause the light valve 22' to sequentially display a series of resolution-enhancing patterns while light from object 40' passes through the light valve 22'.

As discussed above, a light valve may be variously configured while remaining within the scope of this disclosure. In some embodiments, light valve 22' may take the form of a liquid crystal display. In other embodiments, light valve 22' may take the form of an electrowetting display or other suitable light valve. Detector 38' may include a charge-coupled device (CCD) image sensor, a complementary metal-oxide-semiconductor (CMOS) image sensor, or another suitable image sensor. Controller 16' may be any suitable device capable of causing light valve 22' to sequentially display a series of resolution-enhancing patterns (e.g., computing system 10' of FIG. 9).

As described herein, the above described methods and processes may be tied to a computing system 10'. FIG. 9 schematically shows a block diagram of computing system 10' that may perform one or more of the above described methods and processes. Computing system 10' includes a logic subsystem 130 and a data-holding subsystem 132 that may cooperatively serve as controller 16 from FIG. 1. Computing system 10' may also include optical system 14, as described above.

Logic subsystem 130 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 132 may include one or more physical, non-transitory, devices configured to hold data and/or instructions executable by the logic subsystem to implement the herein described methods and processes. When such methods and processes are implemented, the state of data-holding subsystem 132 may be transformed (e.g., to hold different data). Data-holding subsystem 132 may include removable media and/or built-in devices. Data-holding subsystem 132 may include optical memory devices, semiconductor memory devices, and/or magnetic memory devices, among others. Data-holding subsystem 132 may include devices with one or more of the following characteristics: volatile, nonvolatile, dynamic, static, read/write, read-only, random access, sequential access, location addressable, file addressable, and content addressable. In some embodiments, logic subsystem 130 and data-holding subsystem 132 may be integrated into one or more common devices, such as an application specific integrated circuit or a system on a chip.

FIG. 9 also shows an aspect of the data-holding subsystem in the form of computer-readable removable media 134, which may be used to store and/or transfer data and/or instructions executable to implement the herein described methods and processes.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:
1. An image detection system, comprising:
a display surface configured to visually present a visual display image;
a light valve;
a detector positioned to detect light travelling from an object through the light valve; and
a controller configured to:
cause the light valve to sequentially display a series of resolution-enhancing patterns to sequentially block light from different portions of the object;

determine an object area on the display surface where the object is located while the display surface visually presents the visual display image;

confine sequential display of the series of resolution-enhancing patterns to the object area; and integrate light detected by the detector at different times during sequential display of the resolution-enhancing patterns without disrupting visual presentation of the visual display image except where registered with the object.

2. The image detection system of claim 1, where the light valve is a liquid crystal display.

3. The image detection system of claim 1, further comprising one or more infrared emitters configured to produce one or more bands of reference light to be reflected off the object and through the light valve while the light valve sequentially displays the series of resolution-enhancing patterns.

4. The image detection system of claim 1, where the resolution-enhancing patterns include a spatially repeating block of N pixel groups, each block including two or more rows of pixel groups and two or more columns of pixel groups, and where, for N sequential frames, a different pixel group in the block opens to allow light to travel from the object to the detector while all other pixel groups in the block close to block light travelling from the object to the detector.

5. The image detection system of claim 4, where the controller integrates light detected by the detector during N sequential frames.

6. The image detection system of claim 1, further comprising a wedge-shaped light guide optically intermediate the display surface and the detector.

7. The image detection system of claim 6, where the light valve is configured to modulate image light into the visual display image provided to the display surface.

8. The image detection system of claim 6, where the wedge-shaped light guide includes a front face facing the display surface, a back face facing away from the display surface, a thinner side, and a thicker side, the thicker side having an array of facets; and where the light reflected from the object at the display surface travels into the wedge-shaped light guide through the front face of the wedge-shaped light guide and reflects off the array of facets before travelling out of the thinner side of the wedge-shaped light guide to the detector.

9. A method of enhancing input imaging resolution in a touch-sensitive display including a wedge-shaped light guide including an array of facets, the method comprising:

sequentially blocking reference light reflected from different portions of an object with a series of resolution-enhancing patterns displayed only between the object and the wedge-shaped light guide without disrupting visual presentation of an image displayed on the touch-sensitive display except where registered with the object;

determining an object area on a display surface of the touch-sensitive display where the object is located and confining sequential blocking of reference light with the series of resolution-enhancing patterns to the object area;

detecting reference light filtered by the series of resolution-enhancing patterns, travelling through the wedge-shaped light guide, and reflecting off the array of facets within the wedge-shaped light guide; and integrating reference light detected while different resolution-enhancing patterns of the series of resolution-enhancing patterns are displayed between the object and the wedge-shaped light guide.

10. The method of claim 9, further comprising modulating image light via a light valve into a visual display image provided to a display surface of the touch-sensitive display.

11. The method of claim 9, further comprising receiving, at a front face of the wedge-shaped light guide, reference light reflecting from the object at a display surface of the touch-sensitive display before reflecting reference light off the array of facets within the wedge-shaped light guide.

12. A touch-sensitive display, comprising:

a display surface;

a wedge-shaped light guide including a front face facing the display surface, a back face facing away from the display surface, a thinner side, and a thicker side, the thicker side having an array of facets;

a light valve optically intermediate the display surface and the front face of the wedge-shaped light guide, the light valve configured to modulate image light into a visual display image provided to the display surface;

a detector positioned to detect reference light exiting the thinner side of the wedge-shaped light guide, the reference light reflected from an object at the display surface, travelling into the wedge-shaped light guide through the front face of the wedge-shaped light guide, and reflecting off the array of facets before travelling out of the thinner side of the wedge-shaped light guide to the detector; and a controller configured to analyze an amount or pattern of reference light detected by the detector to determine an object area on the display surface where the object is located, the controller further configured to cause the light valve to sequentially display a series of resolution-enhancing patterns only at the object area to block reference light reflected from different portions of the object such that visual presentation of the visual display image is not interrupted except where registered with the object, and the controller further configured to integrate reference light detected by the detector during sequential display of the resolution-enhancing patterns.

13. The touch-sensitive display of claim 12, where the light valve is a liquid crystal display.

14. The touch-sensitive display of claim 12, further comprising one or more infrared emitters configured to produce one or more bands of the reference light.

15. The touch-sensitive display of claim 12, where the reference light includes infrared light and visible light.

16. The touch-sensitive display of claim 12, where the resolution-enhancing pattern includes a spatially repeating block of N pixel groups, and where, for N sequential frames, a different pixel group in the block opens to allow reference light to travel from the object to the detector while all other pixel groups in the block close to block reference light travelling from the object to the detector.

17. The touch-sensitive display of claim 16, where the controller integrates reference light detected by the detector during N sequential frames.

* * * * *